UNITED STATES PATENT OFFICE.

HENRY T. JARRETT, OF NEW YORK, N. Y.

PROCESS OF MAKING POTASSIUM BITARTRATE.

SPECIFICATION forming part of Letters Patent No. 572,345, dated December 1, 1896.

Application filed July 11, 1894. Serial No. 517,235. (No specimens.)

*To all whom it may concern:*

Be it known that I, HENRY T. JARRETT, of New York, in the county and State of New York, have invented a new and useful Improvement in Methods of Manufacturing Bitartrate of Potash from Argols, of which the following is a specification.

My invention relates to an improvement in the method of manufacturing bitartrate of potash from argols, a substance which settles in the bottom of and clings to the sides of wine-casks after the wine has been drawn off subsequent to the initial fermentation. The argols, composed mainly of bitartrate of potash and tartrate of lime, are saturated with certain coloring-matters, such, for example, as œnolin, which have hitherto been removed with difficulty in the attempt to obtain a pure white bitartrate of potash.

In an application filed by myself jointly with Felix C. T. Thiele, October 6, 1893, Serial No. 487,371, allowed December 2, 1893, we set forth specifically the manufacture of the bitartrate of potash from argols by first dissolving the argols in an acid and finally precipitating the potash by an alkali or alkaline substance.

My present invention relates to a specific method of manufacturing the bitartrate of potash from argols by first dissolving the argols in an alkali or alkaline substance and finally precipitating the bitartrate of potash by means of an acid.

In practically carrying my method into effect the argols are first dissolved in a solution of caustic soda or its carbonate, or both, to the point of neutralization, which almost entirely decomposes the coloring-matter or renders it insoluble. I then add chlorid of potassium, equal to the weight of one-tenth of the argols taken, and the solution is then filtered. The filtered liquid is then mixed with a decolorizing agent, such, for example, as hypochlorite of soda or lime, or hypochlorous acid, or a solution of sulfurous acid, to decolorize it, if such bleaching is considered necessary, and the bitartrate of potash is then precipitated in a pure state by adding an equivalent quantity of an acid, preferably acetic acid.

The yield of bitartrate of potash obtained by this process is very high, as the tartrate of lime during the process is converted into bitartrate of potash, which increases the percentage of the precipitate.

What I claim is—

1. The method of manufacturing bitartrate of potash from argols, consisting in first dissolving the argols in caustic soda to decompose the coloring-matter, or to render it insoluble, introducing the carbonate of soda to precipitate the lime, adding a compound of potassium and finally precipitating the bitartrate of potash directly from the mixture by the introduction of an acid.

2. The method of manufacturing bitartrate of potash from argols, consisting in first dissolving the argols in caustic soda to decompose the coloring-matter or to render it insoluble, introducing the carbonate of soda to precipitate the lime, adding a compound of potassium, introducing a decoloring agent and finally precipitating the bitartrate of potash directly from the mixture by the introduction of an acid.

HENRY T. JARRETT.

Witnesses:
   IRENE B. DECKER,
   FREDK. HAYNES.